United States Patent [19]

Thompson

[11] 3,980,492
[45] Sept. 14, 1976

[54] REACTIVE PIGMENTS AND METHODS OF PRODUCING THE SAME

[75] Inventor: Thomas D. Thompson, Flemington, N.J.

[73] Assignee: Yara Engineering Corporation, Elizabeth, N.J.

[22] Filed: June 13, 1975

[21] Appl. No.: 586,558

[52] U.S. Cl. ............... 106/308 N; 427/150; 106/288 B; 106/308 Q; 106/288 Q
[51] Int. Cl.² ............... C09C 1/42; B41M 5/22
[58] Field of Search ......... 106/308 N, 72, 288 B, 106/288 Q; 427/150

[56] References Cited
UNITED STATES PATENTS

| | | |
|---|---|---|
| 3,211,565 | 10/1965 | Bundy .................................. 106/72 |
| 3,753,761 | 8/1973 | Sugahara et al ................. 106/288 B |
| 3,862,027 | 1/1975 | Mercade ......................... 106/288 B |
| 3,924,027 | 12/1975 | Saito et al .......................... 427/150 |

*Primary Examiner*—Winston A. Douglas
*Assistant Examiner*—J. V. Howard
*Attorney, Agent, or Firm*—Buell, Blenko & Ziesenheim

[57] ABSTRACT

Reactive pigments and methods of producing the same for use in manifold copy systems is provided in which a member from the group consisting of bentonite and montmorillonite is admixed with kaolinite, added to an aqueous solution of a polyvalent cation, a ligand is added and the solids separated, dried and pulverized.

10 Claims, No Drawings

REACTIVE PIGMENTS AND METHODS OF PRODUCING THE SAME

This invention relates to methods of producing reactive pigments and particularly to the production of pigments for use in pressure sensitive record materials.

The use of pigments in paper coatings for manifold copy systems is not in itself new. Such manifold copy systems have, however, been based upon the use of oxidizing clays and special acid leached bentonites as the basis for the pigment. Such systems are disclosed in U.S. Pat. Nos. 3,753,761; 3,622,364; 3,565,653; 3,455,721; 2,712,507; 2,730,456; 3,226,252; 3,293,060 and Canadian Pat. No. 780,254.

These pressure sensitive record materials are frequently termed "carbonless carbon papers" and are, in general, highly successful in reproducing copies.

The present invention provides a marked improvement over these prior art pressure sensitive record materials. It provides excellent dye development and light fastness without the necessity of an acid leached bentonite. It provides improved intensity of dye development as compared with present pigments. Improved rheology in the coating mixture results so that it can be coated at high solids on a blade coater. It provides sufficient flexibility so that both image intensity and color can be varied and controlled to a degree unthought of with prior art materials. Finally, but not least in importance, improved coated sheet properties such as brightness, whiteness index, opacity, smoothness and gloss are obtained.

The improved reactive pigments of this invention comprise in combination a polyvalent cation, a ligand, a bentonite or montmorillonite and a kaolinite. The preferred polyvalent cation is copper as $CuCl_2$. The preferred ligand is 1,6-hexanediamine. Other polyvalent cations may be used, e.g. Cr., Fe, Co, Ni, Zn, and Al preferably as a mineral acid salt such as the chloride. The same is true of the ligand, where other ligands such as gluconic acid, isostearic acid, sodium dimethyl dithiocarbamate, and others may be used. The term bentonite is used generically to describe the unrefined rock from which montmorillonite, a swelling clay, is fractionated.

The process of producing such reactive pigment is illustrated in the following example

EXAMPLE I

Forty-five grams of montmorillonite (or bentonite) is combined with 135 g. of kaolinite and dispersed in 900 g. water. To this mixture, 1.98 g. $CuCl_2$ in 50 g. $H_2O$ is added and allowed to stir for 15 minutes, at which time 1.80 g. 1,6-hexanediamine in 50 g. $H_2O$ is added and allowed to stir for an additional 30 minutes. The slurry is then filtered and dried at 90°C. overnight. The dried filter cake is pulverized three times on a Mikro Samplmill.

The above procedure can be illustrated as follows:

$$\frac{45 \text{ g. Montmorillonite} + 135 \text{ g. Kaolinite}}{900 \text{ g. } H_2O} + \frac{1.98 \text{ g. } CuCl_2}{50 \text{ g. } H_2O} +$$

$$\frac{1.80 \text{ g. 1,6-Hexanediamine}}{50 \text{ g. } H_2O}$$

Various reactive pigments were prepared using different metal ions, different ligands, different bentonites and kaolins.

The various reactive pigments were evaluated using the following coating formulation In a 200 ml. tall beaker, place 65 ml. water and (0.5%) 0.40 g. Calgon (sodium hexametaphosphate). Place on Hamilton Beach mixer and mix to dissolve Calgon. Add pigment slowly until all pigment is incorporated and blunge for 5 minutes. At this point, clay-water viscosity measurements can be taken.

To the clay-water dispersion, 19.5 g. Dow Latex 638 is added and mixed on a low speed mixer for 5 minutes. At this point, the coating color viscosity measurements are taken. Hand sheets are made using a blade applicator. The coat weight on the hand sheet was 3.0 lbs./ream ($3300^2$ ft.).

The hand sheets were evaluated for image intensity and color using a Spectronic 505. The image intensity is recorded as the optical density at 6140 A on the developed sheet minus the optical density at 6140 A on the undeveloped sheet. The hand sheets were developed first by calendering the sheet using only the pressure of the rolls and then passing the sheets through a second time with a 2 inch square of CB sheet taped on top of the hand sheet or CF sheet. The CB sheet is coated on the backside with microcapsules containing dye precursor of the following types:

Type I Dyes

Colorless dyes which develop intense colors immediately upon contact with Bronsted acid-and/or Lewis acid-type substrates. The color development is influenced by environmental pH and/or polarization of the dye. Examples of type I dyes are crystal violet lactone and other triarylmethane dyes, such as malachite green lactone. Michler's ketone and Michler's hydrol as well as other diphenylmethanes are also examples of type I dyes.

Type II Dyes

Colorless dyes which do not immediately develop an intense color upon contact with a reactive pigment, but, with time, an intense color will develop by means of oxidation and/or an electron transfer mechanism. Examples of the type II dyes are thiazines, such as benzoyl leuco-methylene blue, and triarylmethane, such as leuco-crystal violet and leuco-malachite green.

The optical density data reported in the following examples were based on a diphenylmethane type I dye precursor. The brightness and whiteness index were measured in accordance to the TAPPI procedures. Redness is the ratio of the optical density at 5300 A to the optical density at 6140 A times 100. The redness of the image is of important because a red image will xerox better than a blue image.

The effect of changing metal ions on the reactive pigment is set out in Table I below:

TABLE I

Effect of Metal Ions 45 g. Montmorillonite + 135 g. Kaolinite + X g. $MeCl_2$ + 0.9 g. 1,6-Hexanediamine
900 g. $H_2O$  50 g. $H_2O$  50 g. $H_2O$

| | | BROOKFIELD Viscosity (cpe) | | HERCULES dynes | OPTICAL DENSITY 1 Hour | % Redness |
|---|---|---|---|---|---|---|
| | | 10 RPM | 100 | | | |
| 1. | 3.96 g. $CrCl_3 . 6 H_2O$ | 180 | 86 | 6.5 | 0.683 | 52.0 |
| 2. | 3.96 g. $FeCl_3 . 6 H_2$ | 1720 | 236 | 0.9 | 0.747 | 43.6 |
| 3. | 3.50 g. $CoCl_2 . 6 H_2O$ | 180 | 80 | 0.6 | 0.713 | 44.7 |
| 4. | 3.50 g. $NiCl_2 . 6 H_2O$ | 200 | 80 | 0.6 | 0.691 | 47.0 |
| 5. | 1.98 g. $CuCl_2$ | 180 | 64 | 0.7 | 0.642 | 39.2 |
| 6. | 1.98 g. $ZnCl_2$ | 260 | 112 | 0.6 | 0.686 | 44.9 |
| 7. | 0.99 g. $ZnCl_2$ + 0.99 g. $CuCl_2$ | 80 | 56 | 0.5 | 0.720 | 40.1 |
| 8. | 9.90 g. $Al_2(SO_4)_3.18 H_2O$ | 100 | 68 | 0.6 | 0.680 | 32.1 |
| 9. | 3.60 g. $CuSO_4 . 5 H_2O$ | 80 | 64 | 0.8 | 0.667 | 40.5 |
| 10. | 1.81 g. $CaCl_2 . 2 H_2O$ | 880 | 296 | 1.7 | 0.642 | 33.6 |

As shown in Table I, the metal ion is capable of effecting the rheology, image intensity, and image color or redness.

The effect of varying the liquid composition is set out in Table II.

TABLE II

Effect of Ligands 45 g. Montmorillonite + 135 g. Kaolinite + 1.98 g. $CuCl_2$ + X g. Ligand
900 g. $H_2O$  50 g. $H_2O$  50 g. $H_2O$

| Sample | BROOKFIELD Viscosity (cpe) | | HERCULES dynes | Optical Density 1 Hour | % Redness |
|---|---|---|---|---|---|
| | 10 RPM | 100 | | | |
| 2.25 g. Tartaric Acid | 19,200 | 3360 | — | 0.677 | 67.7 |
| 1.80 g. 1,6-Hexanediamine | 60 | 46 | 0.9 | 0.663 | 44.9 |
| 5.58 g. Gluconic Acid | 1040 | 328 | 1.8 | 0.568 | 56.7 |
| 3.96 g. Isostearic Acid | 880 | 252 | 1.7 | 0.612 | 44.6 |
| 0.25 g. Sodium Dimethyl Dithio-carbamate | 2760 | 712 | 2.3 | 0.548 | 54.9 |
| 0.77 g. 2-4 Pentanedione | 700 | 260 | 2.4 | 0.744 | 53.2 |
| 1.13 g. Adipic Acid | 1300 | 460 | 3.7 | 0.702 | 58.4 |
| 0.69 g. B Alinine | 560 | 240 | 2.9 | 0.728 | 50.1 |
| 1.04 g. DL-Aspartic Acid pH =3.0 | 32,000 | 3840 | 6.0 | 0.667 | 55.0 |
| 1.04 g. DL-Aspartic Acid pH =4.6 | 1,260 | 472 | 5.4 | 0.696 | 46.0 |
| 1.04 g. DL-Aspartic Acid pH =6.3 | 900 | 368 | 4.3 | 0.670 | 39.7 |
| 0.73 g. 2 Aminopyridine | 80 | 68 | 1.6 | 0.677 | 49.5 |
| 1.91 g. Aminoguanidine Sulfate | 200 | 104 | 2.4 | 0.706 | 42.1 |
| 1.41 g. 4-Nitroanthanilic Acid | 230 | 120 | 2.3 | 0.689 | 56.6 |
| 0.84 g. 2-Amino-6-Methyl Pyridine | 40 | 50 | 1.2 | 0.718 | 46.5 |
| 0.92 g. Benzimidazole | 80 | 72 | 1.5 | 0.701 | 45.8 |

The influence of the ligand is primarily on the rheological properties. There appears to be no correlation between rheology and imaging intensity and image color or redness.

The effect of varying the concentration of the preferred ligand is set out in Table III.

TABLE III

Effect of 1,6-Hexanediamine Content 45 g. Montmorillonite + 135 g. Calcined Kaolinite + 1.62 g. $CuCl_2$ + X g. 1,6-Hexanediamine
900 g. $H_2O$  50 g. $H_2O$  50 g. $H_2O$

| 1,6-Hexanediamine | BROOKFIELD Viscosity (cpe) | | Hercules dynes | Optical Density 1 hour | % Redness |
|---|---|---|---|---|---|
| | 10 RPM | 100 | | | |
| 0.00 g. | 1920 | 725 | 3.4 | 0.592 | 48.6 |
| 0.36 g. | 720 | 272 | 1.7 | 0.922 | 53.7 |
| 0.72 g. | 240 | 124 | 1.4 | 0.907 | 45.5 |
| 1.08 g. | 60 | 52 | 0.7 | 0.872 | 35.2 |
| 1.44 g. | 30 | 52 | 0.5 | 0.733 | 31.0 |
| 1.80 g. | 30 | 44 | 0.4 | 0.674 | 27.9 |
| 1.62 g. | 10 | 36 | 0.4 | 0.563 | 26.1 |

The redness is greatest with 0.36 g. 1,6-Hexanediamine per 180 g. pigment (0.2%), as well as the highest image intensity. The rheology is substantially improved over that of the acid leached bentonites.

The effect of different extender pigments on the reactive pigment is illustrated in Table IV.

TABLE IV

Effect of Different Kaolinites and Calcium Carbonate 45 g. Montmorillonite + 135 g. Extender + 1.98 g. $CuCl_2$ + 0.9 g. 1,6-Hexanediamine
900 g. $H_2O$    50 g. $H_2O$    50 g. $H_2O$

| Sample | BROOKFIELD Viscosity (cpe) 10 RPM | 100 | Hercules dynes | Optical Density 1 hour | % Redness |
|---|---|---|---|---|---|
| Premax | 40 | 46 | 0.6 | 0.713 | 40.0 |
| KCS | 60 | 52 | 0.6 | 0.678 | 39.2 |
| WP | 80 | 64 | 0.6 | 0.711 | 40.2 |
| Astra Plate | 100 | 72 | 1.0 | 0.734 | 39.5 |
| Glomax PJD | 40 | 52 | 0.8 | 0.829 | 37.0 |
| Glomax JD | 40 | 52 | 0.8 | 0.858 | 41.8 |
| Atomite | 60 | 60 | 0.6 | 0.591 | 35.0 |

This Table shows that extender pigments, such as hydrous keolinites, calcined kaolinites, and calcium carbonate, exert only minor influence or rheological properties, but drastically influence image intensity. The calcined clays give the greatest improvement in image intensity.

In Table V, the effect of different bentonites or montmorillonites is set out.

of a blue sample. The term bentonite is used to refer to a rock, while the term montmorillonite refers to a type of swelling clay recovered by means of fractionating a bentonite. Experiments were carried out using both bentonite and montmorillonite showing that the rheology, image intensity, and image color were the same. Only the amount of grit in the final samples varied. When the bentonite was used, greater grit or 325 mesh

TABLE V

Effect of Different Bentonites or Montmorillonites 45 g. Montmorillonite + 135 g. Kaolinite + 1.98 g. $CuCl_2$ + 1.80 g. 1,6-Hexanediamine
900 g. $H_2O$    50 g. $H_2O$    50 g. $H_2O$

| Sample | BROOKFIELD Viscosity (cpe) 10 RPM | 100 | Hercules dynes | Optical Density 1 hour | % Redness |
|---|---|---|---|---|---|
| Gelwhite | 60 | 46 | 0.9 | 0.663 | 44.9 |
| K-4 | 20 | 44 | 0.2 | 0.698 | 32.4 |
| K-2 | 10 | 38 | 0.4 | 0.768 | 32.0 |
| 910 | 60 | 56 | 0.8 | 0.638 | 30.7 |
| Mississippi | 20 | 36 | 0.4 | 0.400 | 32.5 |

The Gelwhite sample has the greatest redness which would Xerox better than the other bentonite samples. Improved Xerox capability means that a sample with greater redness will be reproduced with equal intensity residue was obtained.

The variation of bentonite content and its effect on the reactive pigment are shown in Tables VIa and VIb.

TABLE VIa

Effect of Bentonite Content

X g. Bentonite + Y g. Kaolinite + 1.98 g. $CuCl_2$ + 0.9 g. 1,6-Hexanediamine
900 g. $H_2O$    50 g. $H_2O$    50 g. $H_2O$

| Samples | BROOKFIELD Viscosity (cpe) 10 RPM | 100 | Hercules dynes | Optical Density 1 Hour | % Redness |
|---|---|---|---|---|---|
| 15% 27 g. Bentonite 85% 153 g. Kaolinite | 30 | 40 | 0.4 | 0.617 | 30.1 |
| 20% 36 g. Bentonite 80% 144 g. Kaolinite | 120 | 64 | 0.7 | 0.655 | 34.4 |
| 25% 45 g. Bentonite 75% 135 g. Kaolinite | 300 | 128 | 1.1 | 0.664 | 38.2 |
| 30% 54 g. Bentonite 70% 126 g. Kaolinite | 2120 | 690 | 2.9 | 0.634 | 38.2 |
| 35% 63 g. Bentonite 65% 117 g. Kaolinite | 5120 | 1600 | 5.2 | 0.609 | 38.8 | even though its image intensity may be lower than that

TABLE VIb

Effect on Montmorillonite Content

X g. Montmorillonite + Y g. Calcined Kaolinite + 1.98 g. $CuCl_2$ + 0.9 g. 1,6-Hexanediamine
900 g. $H_2O$    50 g. $H_2O$    50 g. $H_2O$

| Samples | BROOKFIELD Viscosity (cpe) 10 RPM | 100 | Hercules dynes | Optical Density 1 Hour | % Redness 1 Hour |
|---|---|---|---|---|---|
| 25% Montmorillonite 75% Calcined Kaolinite | 420 | 198 | 2.2 | 0.807 | 52.3 |

TABLE VIb-continued

Effect on Montmorillonite Content

$$\frac{X \text{ g. Montmorillonite} + Y \text{ g. Calcined Kaolinite}}{900 \text{ g. } H_2O} + \frac{1.98 \text{ g. } CuCl_2}{50 \text{ g. } H_2O} + \frac{0.9 \text{ g. 1,6-Hexanediamine}}{50 \text{ g. } H_2O}$$

| Samples | BROOKFIELD Viscosity (cpe) 10 RPM | 100 | Hercules dynes | Optical Density 1 Hour | % Redness 1 Hour |
|---|---|---|---|---|---|
| 20% Montmorillonite 80% Calcined Kaolinite | 140 | 84 | 1.4 | 0.804 | 47.0 |
| 15% Montmorillonite 85% Calcined Kaolinite | 40 | 46 | 0.6 | 0.780 | 39.1 |
| 10% Montmorillonite 90% Calcined Kaolinite | 20 | 40 | 0.3 | 0.572 | 32.3 |

The bentonite was fractionated by sedimentation in order to remove everything greater than 5 microns, thereby resulting in a montmorillonite.

Tables VIa and VIb show that the optimum amount of bentonite with regard to image intensity was obtained with 25% bentonite and 75% kaolinite.

In order to show the improved properties of the reactive pigment as compared with acid leached bentonites, several samples of each were examined in detail with regard to image intensity, image color and rheology.

The aqueous viscosity and coating color viscosity data were obtained on compositions similar to those of the new reactive pigment of this invention but were made down at 45% solids instead of 60% solids.

TABLE VII

Clay - Water Viscosity

| Sample | Dispersing Agent | % D.A. | % Solids | cpe Brookfield 10 RPM | 100 | Hercules | |
|---|---|---|---|---|---|---|---|
| MBF 530 | Calgon | 6.8 | 45 | 2920 | 1144 | 12.5 | dynes |
| MBF 530 | Dispex N-40 | 4.4 | 45 | 4640 | 1808 | 15.6 | dynes |
| Silton | Calgon | 3.5 | 45 | 180 | 148 | 5.0 | dynes |
| *Reactive Pigment No. 1 | Calgon | 0.5 | 62 | 7000 | 1640 | 775 | rpm |
| Reactive Pigment No. 1 | Dispex N-40 | 0.53 | 62 | 4320 | 1412 | 560 | rpm |
| **Reactive Pigment No. 2 | Calgon | 0.5 | 62 | 700 | 193 | 14.5 | dynes |
| Reactive Pigment No. 2 | Dispex N-40 | 0.53 | 62 | 900 | 280 | 13.2 | dynes |

*Reactive Pigment No. 1

$$\frac{45 \text{ g. K-4} + 135 \text{ g. Premax}}{900 \text{ g. } H_2O} + \frac{1.98 \text{ g. } CuCl_2}{50 \text{ g. } H_2O} + \frac{0.9 \text{ g. 1,6-Hexanediamine}}{50 \text{ g. } H_2O}$$

**Reactive Pigment No. 2

$$\frac{45 \text{ g. K-4} + 135 \text{ g. Premax}}{900 \text{ g. } H_2O} + \frac{1.98 \text{ g. } CuCl_2}{50 \text{ g. } H_2O} + \frac{1.8 \text{ g. 1,6-Hexanediamine}}{50 \text{ g. } H_2O}$$

TABLE VIII

Coating Color Viscosity

| Sample | Dispersing Agent | % D.A | % Solids | Brookfield Viscosity (cpe) 10 rpm | 100 rpm | Hercules |
|---|---|---|---|---|---|---|
| MBF 530 | Calgon | 6.8 | 45 | 28,600 | 6080 | 670 rpm |
| MBF 530 | Dispex N-40 | 4.4 | 45 | 3,920 | 1200 | 5.1 dynes |
| Silton | Calgon | 3.5 | 45 | 80 | 92 | 2.1 dynes |
| Reactive Pigment No. 1 | Calgon | 0.55 | 60 | 3,200 | 896 | 5.4 dynes |
| Reactive Pigment No. 1 | Dispex N-40 | 0.58 | 60 | 1,960 | 524 | 6.2 dynes |
| Reactive Pigment No. 2 | Calgon | 0.55 | 60 | 850 | 25 | 2.1 dynes |
| Reactive Pigment No. 2 | Dispex N-40 | 0.44 | 60 | 520 | 152 | 2.0 dynes |

TABLE IX

| Sample | Dispersing Agent | Optical Density Immediate | % Redness | Optical Density 20 mins. | % Redness | 1 hour | % Redness |
|---|---|---|---|---|---|---|---|
| MBF 530 | Calgon | 0.589 | 51.6 | 0.593 | 52.4 | 0.583 | 53.0 |
| MBF 530 | Dispex N-40 | | | | | 536 | 65.3 |
| Silton | Calgon | 0.501 | 77.6 | 0.501 | 80.0 | 0.481 | 82.1 |
| Reactive Pig. No. 1 | Calgon | 0.642 | 31.6 | 0.668 | 34.1 | 0.692 | 37.7 |
| Reactive Pig. No. 1 | Dispex N-40 | 0.684 | 35.2 | 0.694 | 36.7 | 0.715 | 38.9 |
| Reactive Pig. No. 2 | Calgon | 0.574 | 28.2 | 0.588 | 27.5 | 0.649 | 32.7 |
| Reactive Pig. No. 2 | Dispex N-40 | 0.584 | 27.7 | 0.612 | 29.7 | 0.673 | 32.7 |

The image intensity is better for the reactive pigment when compared to the acid leached bentonites while the redness appears to be somewhat lower for the active clays.

While I have illustrated and described certain presently preferred embodiments and practices of my invention it will be understood that this invention may be otherwise embodied within the scope of the following claims.

I claim:

1. A reactive pigment for manifold copy systems consisting essentially of the solid reaction product of a polyvalent cation, a ligand, a member selected from the group consisting of bentonite and montmorillonite and a kaolinite.

2. A reactive pigment as claimed in claim 1 wherein the kaolinite is calcined kaolinite.

3. A reactive pigment as claimed in claim 1 wherein the ligand is 1,6-Hexanediamine.

4. A reactive pigment as claimed in claim 1 wherein the polyvalent ion is $Cu^{++}$ derived from $CuCl_2$.

5. A reactive pigment as claimed in claim 1 wherein the ratio of the member selected from the group consisting of montmorillonite and bentonite to kaolinite is 25% to 75%.

6. A reactive pigment as claimed in claim 1 wherein the ratio of the member selected from the group consisting of montmorillonite and bentonite to kaolinite is in the range 20% to 35% montmorillonite to 80% to 65% kaolinite.

7. A method of producing reactive pigments for manifold copy systems comprising the steps:
   a. mixing a member from the group consisting of bentonite and montmorillonite with kaolinite in aqueous suspension,
   b. adding to and dispersing in said mixture a salt of a polyvalent cation,
   c. adding a ligand to and dispersing the same in the mixture of said member from the group consisting of bentonite and montmorillonite with kaolinite and a salt of a polyvalent cation,
   d. separating the solids, and
   e. drying and pulverizing the solids.

8. The method of claim 7 wherein the kaolinite is a calcined kaolinite.

9. The method of claim 7 wherein the salt of a polyvalent cation is $CuCl_2$.

10. The method of claim 7 wherein the ligand is 1,6-Hexanediamine.

* * * * *